United States Patent
Lee

(10) Patent No.: US 8,433,886 B2
(45) Date of Patent: Apr. 30, 2013

(54) NONVOLATILE MEMORY DEVICE INCLUDING A BUFFER RAM AND BOOT CODE MANAGEMENT METHOD THEREOF

(75) Inventor: Hokil Lee, Yongin-si (KR)

(73) Assignee: Samsung Electronics Co., Ltd (KR)

( * ) Notice: Subject to any disclaimer, the term of this patent is extended or adjusted under 35 U.S.C. 154(b) by 504 days.

(21) Appl. No.: 12/657,016

(22) Filed: Jan. 12, 2010

(65) Prior Publication Data

US 2010/0211766 A1     Aug. 19, 2010

(30) Foreign Application Priority Data

Feb. 13, 2009   (KR) .................. 10-2009-0012031

(51) Int. Cl.
*G06F 15/177*   (2006.01)
(52) U.S. Cl.
USPC .................................... 713/2; 713/1; 713/100
(58) Field of Classification Search .................. 713/1, 2, 713/100
See application file for complete search history.

(56) References Cited

U.S. PATENT DOCUMENTS

| | | | |
|---|---|---|---|
| 6,745,278 B2 | 6/2004 | Oba | |
| 7,849,302 B2 * | 12/2010 | Wu | 713/2 |
| 7,908,425 B2 * | 3/2011 | Lee et al. | 711/103 |
| 7,941,593 B2 * | 5/2011 | Lee | 711/103 |
| 2001/0008011 A1 | 7/2001 | Oba | |
| 2005/0204091 A1* | 9/2005 | Kilbuck et al. | 711/103 |
| 2006/0064575 A1* | 3/2006 | Jo | 713/2 |
| 2006/0184724 A1* | 8/2006 | Meir et al. | 711/103 |
| 2007/0028037 A1* | 2/2007 | Kang | 711/104 |
| 2007/0113067 A1* | 5/2007 | Oh et al. | 713/2 |

FOREIGN PATENT DOCUMENTS

| | | |
|---|---|---|
| JP | 11282685 | 10/1999 |
| JP | 2001195241 | 7/2001 |
| KR | 1020010070416 A | 7/2001 |
| KR | 1020080013247 A | 2/2008 |

* cited by examiner

*Primary Examiner* — Paul Yanchus, III
*Assistant Examiner* — Zahid Choudhury
(74) *Attorney, Agent, or Firm* — Onello & Mello, LLP

(57) ABSTRACT

A nonvolatile memory device may includes a cell array to store a boot code; a boot RAM to store the boot code; a data RAM to store user data being exchanged with the external device; and a controller to separately store a boot code provided from the cell array in the boot RAM and the data RAM when a booting operation is performed.

5 Claims, 4 Drawing Sheets

NONVOLATILE MEMORY DEVICE INCLUDING A BUFFER RAM AND BOOT CODE MANAGEMENT METHOD THEREOF

CROSS-REFERENCE TO RELATED APPLICATIONS

This application claims priority under 35 U.S.C. §119 to Korean Patent Application No. 10-2009-0012031, filed on Feb. 13, 2009, the contents of which are herein incorporated by reference in their entirety.

BACKGROUND OF THE INVENTIVE CONCEPT

1. Field

The present inventive concept relates to electronic devices, and more particularly, to nonvolatile memory devices including a buffer ram and boot code management methods thereof.

2. Description of the Related Art

Generally, a semiconductor memory is the most necessary micro electronic device in a digital logic design, such as a computer, and in applications using microprocessors ranging from satellites to consumer electronic techniques. Thus, development of a technique for manufacturing a semiconductor memory including a process improvement and a technical development obtained through scaling for a high integration and a high speed is helpful in establishing a performance standard of other digital logic systems.

Semiconductor memory devices are classified into volatile semiconductor memory devices and nonvolatile semiconductor memory devices. Nonvolatile semiconductor memory devices can store data even when their power supplies are interrupted. Data stored in nonvolatile semiconductor memory devices may be permanent or reprogrammable according to a memory manufacturing technique. Nonvolatile semiconductor memory devices are used to store a program and a micro code in a wide range of applications such as in computers, in avionics, in communications and in a consumer electronics industry.

A typical nonvolatile memory device may be a flash memory device. A NAND-type nonvolatile memory device has an advantage of high integration and high capacity. Due to this advantage, use of NAND-type nonvolatile memory devices has been increasing rapidly in applications for mobile systems and various kinds of application systems. However, the NAND-type nonvolatile memory device has a disadvantage in that a time required by the NAND-type nonvolatile memory device to read and write data is slightly longer than for a RAM. This disadvantage affects performance of a system fitted with a nonvolatile memory device. One fusion memory which makes up for the disadvantage and makes use of the advantage is a oneNAND flash memory device. The oneNAND flash memory device has an input/output protocol of a NOR-type flash memory (or SRAM). The oneNAND flash memory device includes a NAND-type flash memory core suitable for high integration, a high speed buffer RAM, a high speed register and an error correction to embody a more advanced memory performance with high capacity, high speed and high stability.

SUMMARY OF THE INVENTIVE CONCEPT

Embodiments of the inventive concept provide a nonvolatile memory device. The nonvolatile memory device includes a cell array to store a boot code; a boot RAM to store the boot code; a data RAM to store user data being exchanged with the external device; and a controller to separately store the boot code provided from the cell array in the boot RAM and the data RAM when a booting operation is performed.

In one embodiment, the controller stores a first boot code in the boot RAM and stores a second boot code in the data RAM. The first boot code is data to be maintained after the booting operation is finished. In another embodiment, the second boot code is data used only when the booting operation is performed.

In one embodiment, the data RAM supports a dual buffering operation mode.

In one embodiment, the data RAM and the boot RAM are separated from each other.

Embodiments of the inventive concept also provide boot code management methods of a nonvolatile memory device including a boot RAM and a data RAM. The methods include reading out a boot code from a cell array; and storing a first portion of the boot code in the boot RAM and a second portion of the boot code in the data RAM.

In one embodiment, the first portion of the boot code is data to be maintained after a booting operation is finished and the second portion of the boot code is data used only when the booting operation is performed.

In one embodiment, the method further includes dividing the boot code into the first portion of the boot code and the second portion of the boot code.

In one embodiment, the method further includes, during a reset of the data RAM, deleting the second portion of the boot code stored in the data RAM.

BRIEF DESCRIPTION OF THE DRAWINGS

The foregoing and other features and advantages of the inventive concept will be apparent from the more particular description of preferred aspects of the inventive concept, as illustrated in the accompanying drawings in which like reference characters refer to the same parts throughout the different views. The drawings are not necessarily to scale, emphasis instead being placed upon illustrating the principles of the inventive concept. In the drawings, the thickness of layers and regions are exaggerated for clarity.

DETAILED DESCRIPTION OF THE EMBODIMENTS

Preferred embodiments of the inventive concept will be described below in more detail with reference to the accompanying drawings. The embodiments of the inventive concept may, however, be embodied in different forms and should not be constructed as limited to the embodiments set forth herein. Rather, these embodiments are provided so that this disclosure will be thorough and complete, and will fully convey the scope of the inventive concept to those skilled in the art. Like numbers refer to like elements throughout.

Figure 1:
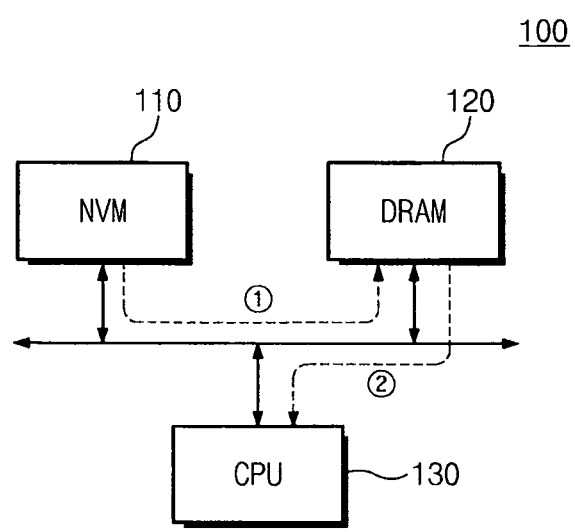
FIG. 1 is a block diagram illustrating a system of the present inventive concept.

FIG. 1 is a block diagram of a system 100 including a nonvolatile memory device 110 of the present inventive concept. Referring to FIG. 1, the system 100 of the present inventive concept may include a nonvolatile memory device 110 (NVM), a dynamic random access memory 120 (DRAM) and a processing unit 130 (CPU).

The nonvolatile memory device 110 can store data stored in a memory cell even when its power supply is interrupted. Thus, the nonvolatile memory device 110 stores data which have to be preserved regardless of whether a power supply is interrupted or not. Also, the nonvolatile memory device 110 stores a boot code for initializing the DRAM 120 and booting the system 100. When a power supply is supplied to the system 100 or the system 100 is reset, the boot code stored in the nonvolatile memory device 110 is stored in the DRAM 120 through a path ①. The boot code stored in the DRAM 120 is patched by the processing unit 130 to initialize the whole system. The nonvolatile memory device 110 stores not only a boot code but also an operating system image. The operating system is also stored in the DRAM 120 through the path ①, similar to the boot code, when a booting operation is performed.

Conventionally, a boot code performs initialization of a basic hardware of the system 100 and reads an application code from the nonvolatile memory device 110 to the DRAM 120. When hardware is initialized, the most basic elements of the hardware are set. However, a capacitance of a boot code may become greater than a capacitance of a buffer device for buffering a boot code. The nonvolatile memory device 110 of the present inventive concept can flexibly store a boot code to provide it to the DRAM 120.

Figure 2:
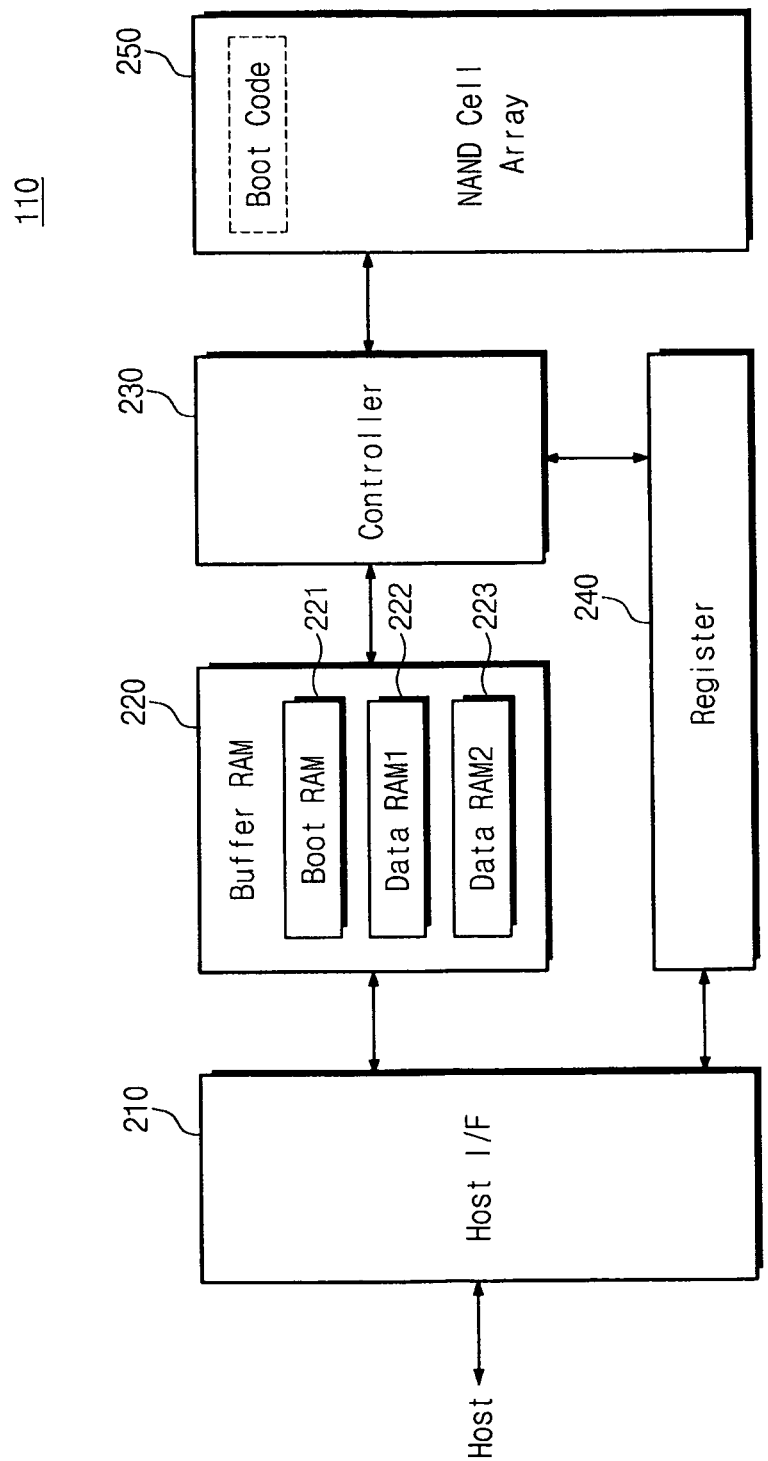
FIG. 2 is a block diagram illustrating a nonvolatile memory device as illustrated in FIG. 1.

FIG. 2 is a block diagram illustrating a nonvolatile memory device 110 illustrated in FIG. 1. Referring to FIG. 2, the nonvolatile memory device 110 includes a host interface 210 for exchanging various data with devices which use different protocols from one another. The nonvolatile memory device 110 includes a buffer RAM 220, a controller 230, a resister 240 and a NAND cell array including nonvolatile memory cells.

The host interface 210 interfaces with a host such as a processing unit or a chip set and with the nonvolatile memory device 110. After the host interface 210 stores data or a control signal being received from the host or stores data being provided from the NAND cell array 250, the host interface 210 performs an interface function including outputting the stored data according to a control of the host. An interface method of the host interface 210 may be embodied by various methods. For example, a oneNAND flash memory device is embodied to have a SRAM (or NOR flash memory) interface method.

The buffer RAM 220 is a high speed bidirectional random access memory which temporally stores data being exchanged between the host interface 210 and the controller 230. Also, when a booting operation is performed, the buffer RAM 220 stores a boot code which is read out from the NAND cell array 250 and transfers the stored boot code to the host.

The buffer RAM includes a boot RAM 221 which temporally stores a boot code and provides the stored boot code to the host. The boot code stored in the NAND cell array 250 is copied to the boot RAM 221 when a booting operation is performed. The buffer RAM 220 includes two data RAMs, namely, data RAM1 222 and data RAM2 223, for supporting a dual buffering operation. Each of data RAM1 222 and data RAM2 223 may be configured to be able to be loaded by a page unit. A capacity size which is loaded at one time access is determined according to a buffer sector counter (BSC).

Since an address of each of data RAM1 222 and data RAM2 223 is comprised of a plurality of, for example, four, sectors, an access by a sector unit is possible. When huge amounts of data are loaded, the controller 230 alternately loads data of a page unit into the data RAM1 222 and the data RAM2 223 with reference to buffer sector addresses (BSA, BSC) provided by the host.

The boot RAM 221 of the present inventive concept has a separated memory region from data RAM1 222 and data RAM2 223. Thus, the buffer RAM 220 does not have a structure such that the boot RAM 221 is shared with the data RAMs data RAM1 222 and data RAM2 223 or one memory region is used as the boot RAM 221 or the data RAMs data RAM1 222 and data RAM2 223. Also, it is apparent to those skilled in the art that the buffer RAM 220 may be embodied using a random access memory, more particularly, a high speed SRAM.

The controller 230 controls an internal operation of the nonvolatile memory device 110 with reference to a stored value of a system configuration register being received from the host. The controller 230 also detects internal states of the nonvolatile memory device 110 and controls a programming and a read operation in the NAND cell array 250 according to a control signal provided in real-time. The controller 230 may be comprised of, for example, a state machine comprised of hardware. When a booting operation is performed, the controller 230 stores a boot code stored in the NAND cell array 250 in the boot RAM 221 or the data RAMs data RAM1 222 and data RAM2 223.

The controller 230 may store a boot code in the boot RAM 221 or the data RAMs data RAM1 222 and data RAM2 223 with reference to properties of data constituting the boot code. That is, among data constituting the boot code, data to be continuously provided to the host is stored in the boot RAM 221. When a booting operation is performed, the controller 230 stores data which is provided to the host only one time in the data RAM1 222. In this case, the boot code stored in the data RAM1 222 is deleted when the booting operation is finished, so the data RAM1 222 has no difficulty in smoothly performing a bidirectional buffering. Alternatively, the controller 230 stores data which is provided to the host only one time in the data RAM2 223. Alternatively, the controller 230 stores data which is provided to the host only one time in the data RAM1 222 and the data RAM2 223.

The register 240 stores an address, a command, configuration information and interrupt state information inputted into the nonvolatile memory device 110 by the host. The controller 230 controls the inside of the nonvolatile memory device 110 with reference to information stored in the register 240. The NAND cell array 250 is a nonvolatile flash memory cell array in which data that the host will store and will read is stored. It is apparent that every circuit (a page buffer, a voltage generator, a select circuit) for writing data in or reading data from a flash memory cell array is further included in the NAND cell array 250.

The nonvolatile memory device 110 including that structure described above may flexibly provide a boot code for initializing various structures which are added or changed according to a trend of high capacity and high integration. That is, even though a capacity of the boot RAM 221 is fixed, the boot RAM 221 may flexibly cope with a situation such that a capacity of a boot code increases by delegating a portion of a function of the boot RAM 221 to the data RAM1 222 and/or the data RAM2 223. When the booting operation is finished, a dual buffering function is not affected because the boot code stored in the data RAM1 222 or the data RAM 223 may be deleted.

Figure 3:
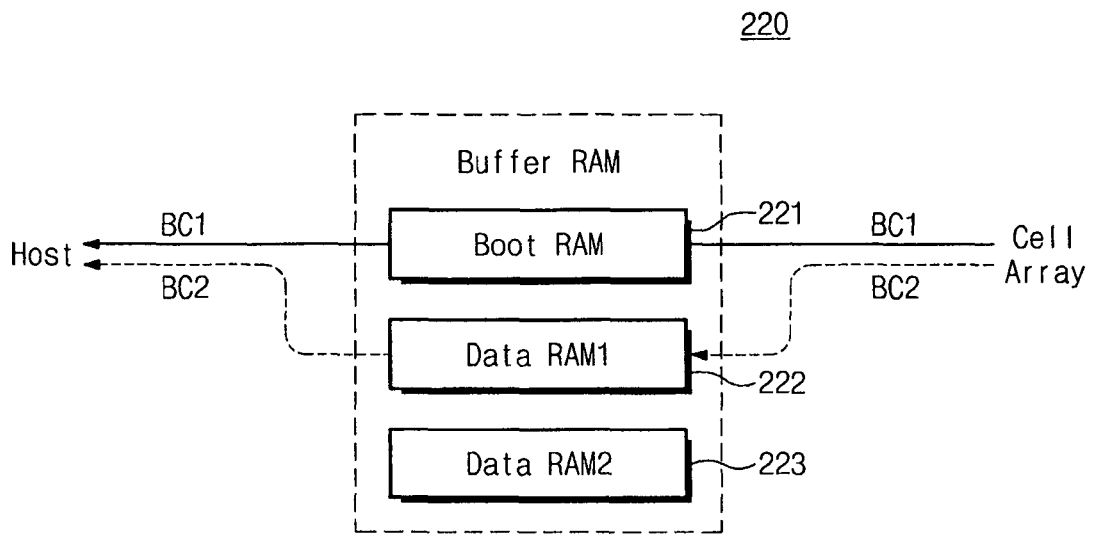
FIG. 3 is a block diagram illustrating a method of providing a boot code of a buffer RAM as illustrated in FIG. 2.

FIG. 3 is a block diagram illustrating a method of storing a boot code of the buffer RAM 220 illustrated in FIG. 2. Referring to FIG. 3, when a booting operation is performed, a boot code is transferred to the host by way of the boot RAM 221 or the data RAM1 222.

When a power is turned on or a reset operation is performed, a boot code stored in the NAND cell array 250 is readout by the controller 230. The readout boot code is divided into a first boot code (BC1) and a second boot code (BC2) by the controller 230. The controller 230 writes the first boot code (BC1) in the boot RAM 221. The controller 230 writes the second boot code (BC2) in the data RAM1 222. Here, the second boot code (BC2), alternatively, may be written in the data RAM2 223. Also, the second boot code (BC2), alternatively, may be divided to be stored in the data RAM1 222 and the data RAM2 223.

The first boot code (BC1) means a boot code data which should be maintained after the booting operation. The second boot code (BC2) should be provided only when the booting operation is performed. That is, the second boot code (BC2) may not be used after the booting operation is finished. When the booting operation is finished, the second boot code (BC2) is deleted from the data RAM1 222, so that a buffering operation of the data RAM is not affected.

Figure 4:
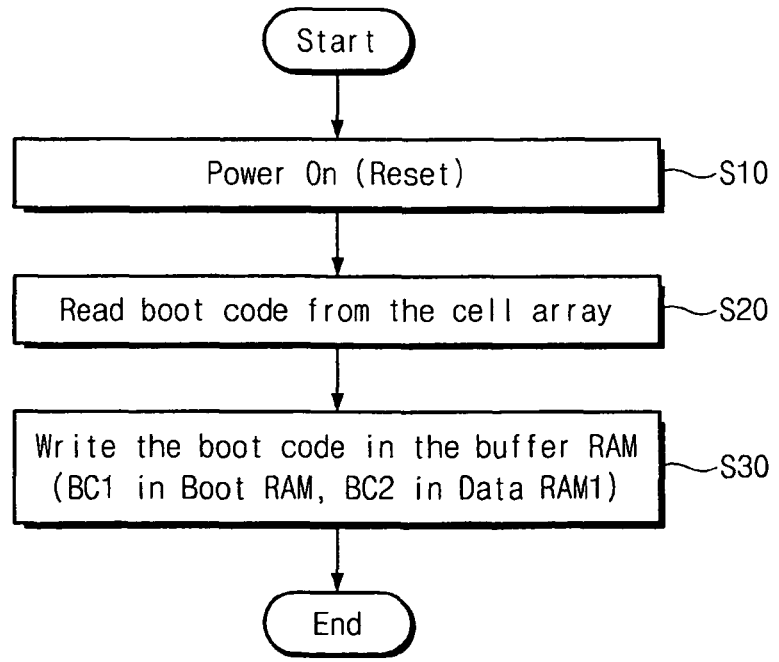
FIG. 4 is a flow chart illustrating a management method of a boot code of the present inventive concept.

FIG. 4 is a flow chart illustrating a method of fetching a boot code by the controller 230 illustrated in FIG. 2. Referring to FIG. 4, the controller 230 fetches a boot code from the NAND cell array 250 to copy it to the buffer RAM 220 when a booting operation is performed.

When a power supply or a reset command is provided, a booting operation of the inventive concept begins (S 10). The controller 230 reads out a boot code programmed in a specific region of the NAND cell array 250 (S20). The controller 230 stores the readout boot code in the buffer RAM 220, but the controller 230 may also store the readout boot code in other regions of the buffer RAM 220 according to properties of sub data constituting a boot code. That is, the first boot code (BC1) having properties which should be maintained after the booting operation is stored in the boot RAM 221. In contrast, the second boot code (BC2) having properties which are used only in a booting operation or which are readout only one time is stored in the data RAM1 222 (S30). Alternatively, the second boot code (BC2) may be stored in the data RAM2 223. Alternatively, the second boot code (BC2) may be divided to be stored in the data RAM1 222 and the data RAM2 223.

Here, the first boot code (BC1) and the second boot code (BC2) may be discriminated by the controller 230. In this case, after the readout operation of the boot code, a step for discriminating the first boot code (BC1) and the second boot code (BC2) is further included.

Also, the first and second boot codes (BC1, BC2) are separately stored in the NAND cell array 250 and may be separately readout when a booting operation is performed. Also, the second boot code (BC2) stored in the data RAM1 222 may be deleted by the boot code described above while the data RAM1 222 is reset.

Figure 5:
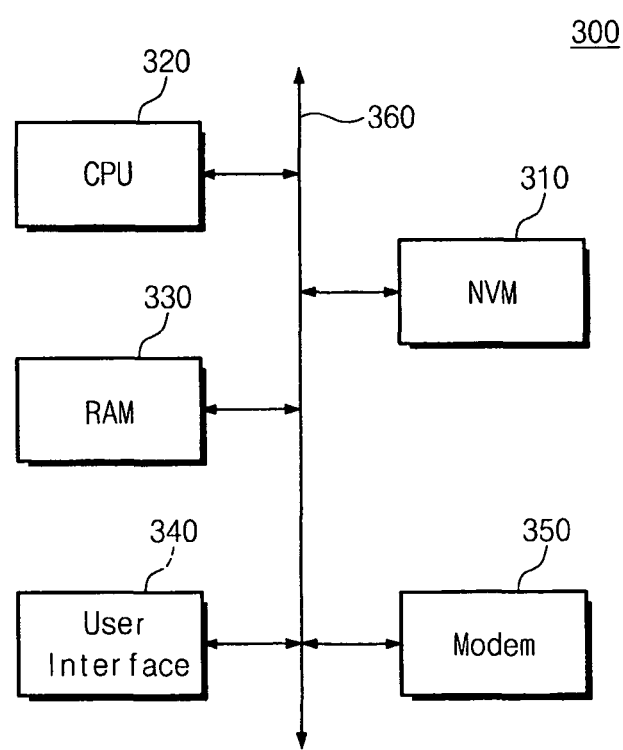
FIG. 5 is a block diagram illustrating a computing system including a nonvolatile memory device of the present inventive concept.

FIG. 5 is a block diagram illustrating a computing system 300 including a nonvolatile memory device 310 (NVM) driven by a management method of a boot code of the present inventive concept. The computing system 300 may include a microprocessor 320, a RAM 330, a user interface 340, a modem 350, like a baseband chipset, and a nonvolatile memory device 310 that are electrically connected to a system bus 360. The nonvolatile memory device 310 includes the controller 230 to store a boot code in the boot RAM 221 or the data RAM1 222 and/or data RAM2 223 according to properties of data constituting the boot code when a booting operation is performed. When the computing system 300 is a mobile device, a battery for supplying an operation voltage of the computing system 300 may be additionally provided.

Although not illustrated in the drawings, it is apparent to those skilled in the art that the computing system 300 may further include an application chip set, a camera image processor (CIS) and a mobile DRAM.

The nonvolatile memory device 310 may be further comprised of a multimedia card, a secure digital (SD) card, a micro SD card, a memory stick, an ID card, a PCMCIA card, a chip card, a USB card, a smart card, a compact flash card. Also, the nonvolatile memory device 310 may be comprised of a solid stage disk (SSD).

The nonvolatile memory device 310 can maintain the stored data even when its power supply is interrupted. As mobile devices such as a cellular phone, PDA, a digital camera, a portable game consol and MP3P are increasingly used, the nonvolatile memory device 310 may be widely used as, not only a data storage, but also as a code storage. A memory card including the nonvolatile memory device 310 may be used in a home application, for example, HDTV, DVD, router and GPS.

The nonvolatile memory device 310 may be applicable to an embedded system. The embedded system is a computing system built in to another device and performs only computing work of a specific object imposed on a device, including itself, unlike a general computer. The embedded system has a central processing unit, needs an operating system and executes an application using the operating system to perform a specific work. Generally, the embedded system is built in to control a military appliance, an industrial appliance, a communication appliance and a home appliance, for example, a set top box, a DTV and a digital camera.

The nonvolatile memory device and/or the memory controller in accordance with the present inventive concept may be mounted using various types of packages. For example, the nonvolatile memory device and/or the memory controller, in accordance with the present inventive concept, may be mounted using packages such as PoP (package on package), ball grid array (BGA), chip scale package (CSP), plastic leaded chip carrier (PLCC), plastic dual in-line package (PDIP), die in waffle pack, die in wafer form, chip on board (COB), ceramic dual in-line package (CERDIP), plastic metric quad flat pack (MQFP), thin quad flat pack (TQFP), small outline (SOIC), shrink small outline package (SSOP), thin small outline (TSOP), thin quad flatpack (TQFP), system in package (SIP), multi chip package (MCP), wafer-level fabricated package (WFP), and wafer-level processed stack package (WSP).

According to a construction and a management method of a boot code of the inventive concept, even though a capacity of a boot code exceeds an existing capacity of a boot RAM, a nonvolatile memory device which can flexibly provide a boot code can be provided.

The above-disclosed subject matter is to be considered illustrative, and not restrictive, and the appended claims are intended to cover all such modifications, enhancements, and other embodiments, which fall within the true spirit and scope of the inventive concept. Thus, to the maximum extent allowed by law, the scope of the inventive concept is to be determined by the broadest permissible interpretation of the following claims and their equivalents, and shall not be restricted or limited by the foregoing detailed description.

What is claimed is:

1. A nonvolatile memory device comprising:
   a cell array to store a boot code;
   a boot RAM to store the boot code;

a data RAM to store user data being exchanged with the external device; and a controller to separately store the boot code provided from the cell array in the boot RAM and the data RAM when a booting operation is performed, wherein the data RAM and the boot RAM are separated from each other, wherein the controller stores a first boot code in the boot RAM and stores a second boot code in the data RAM, wherein the first boot code is data to be maintained after the booting operation is finished, and wherein the second boot code is data used only when the booting operation is performed.

2. The nonvolatile memory device of claim 1, wherein the data RAM supports a dual buffering operation mode.

3. A boot code management method of a nonvolatile memory device including a boot RAM and a data RAM comprising:

reading out a boot code from a cell array; and storing a first portion of the boot code in the boot RAM and a second portion of the boot code in the data RAM which is separated from the boot RAM, wherein the first portion of the boot code is data to be maintained after a booting operation is finished and the second portion of the boot code is data used only when the booting operation is performed;

dividing the boot code into the first portion of the boot code and the second portion of the boot code; and during a reset operation of the data RAM, deleting the second portion of the boot code stored in the data RAM.

4. A nonvolatile memory device comprising:

a cell array to store a boot code;

a boot RAM to store the boot code;

a data RAM to store user data being exchanged with the external device; and a controller to separately store the boot code provided from the cell array in the boot RAM and the data RAM when a capacity of the boot RAM is insufficient during a booting operation, wherein the data RAM and the boot RAM are separated from each other, wherein the controller stores a first boot code in the boot RAM and stores a second boot code in the data RAM, wherein the first boot code is data to be maintained after the booting operation is finished, and wherein the second boot code is data used only when the booting operation is performed.

5. The nonvolatile memory device of claim 4, wherein the boot RAM and data RAM compose a buffer RAM.

* * * * *